United States Patent Office 3,225,086
Patented Dec. 21, 1965

3,225,086
PROCESS FOR MAKING MAHOGANY
SULFONIC ACIDS
Roy C. Sias and Paul C. Kemp, Ponca City, Okla., assignors to Continental Oil Company, Ponca City, Okla., a corporation of Delaware
No Drawing. Filed Apr. 3, 1963, Ser. No. 270,204
11 Claims. (Cl. 260—504)

This invention relates to oil soluble mahogany sulfonic acids and more particularly to a process for preparing these acids essentially free of inorganic salt contaminants.

Oil soluble mahogany sulfonic acids are used as intermediates in the preparation of many commercial products, particularly lubricating oil additives. In the conventional techniques for obtaining these sulfonic acids the sulfonic acids always contain a substantial amount of inorganic salt contaminant such as sodium sulfate. It is usual for so-called high purity mahogany sulfonic acids to contain one or more percent of inorganic salt bodies.

An object of this invention is an oil soluble mahogany sulfonic acid essentially free from inorganic salt contaminants. A particular object of the invention is a process for preparing such sulfonic acids. Other objects of the invention will become apparent in the course of the detailed description thereof.

It has been discovered that a liquid including oil soluble mahogany sulfonic acid can be prepared essentially free of inorganic salt contaminants such as calcium sulfate. Briefly, in the process of the invention a sour oil containing oil soluble mahogany sulfonic acid is physically treated to remove any pepper sludge present therein and any acidic gases therein. This treated sour oil is then further treated with water and, without separation of the water from the oil, further treated with methanol. When the water and methanol treating is carried out under the hereinafter defined conditions a raffinate phase is produced which consists essentially of oil substantially decreased in oil soluble mahogany sulfonic acid content and an extract phase is produced which comprises oil soluble mahogany sulfonic acid, methanol, water, and other acidic bodies. An essentially inorganic salt free liquid phase is obtained by treating the extract phase with a calcium base under hereinafter defined conditions and separating solid bodies present in the calcium treated extract phase. The solid body free liquid phase can be further processed to remove water and methanol and other liquids such as diluent hydrocarbons to obtain essentially pure oil soluble mahogany sulfonic acid.

The oil which contains the desired oil soluble mahogany sulfonic acid may be any hydrocarbon oil which, when treated with concentrated sulfuric acid, reacts to produce appreciable amounts of the desired sulfonic acid. The oil to be acid treated may be a natural hydrocarbon produced from distillation of petroleum or it may be a fraction derived from the product of a hydrocarbon conversion process such as catalytic cracking. Also, the oil to be treated may be derived from a so-called synthetic crude or even derived from a particular process such as alkylation which is intended to produce oil suitable for a given molecular weight sulfonic acid. In general, it is preferred that the hydrocarbon oil to be treated falls in the lubricating oil viscosity range; in general, the normal lower limit of this range is about 80 seconds Saybolt Universal at 100° F.

The concentrated sulfuric acid utilized in the treating process may be any one of those commonly used in refining operations wherein oil soluble mahogany sulfonic acids are produced. In general, sulfuric acid having a concentration of at least 98% is used. More commonly, oleum or the so-called fuming sulfuric acid is used. Processes are known which utilize anhydrous sulfur trioxide as the treating agent and the term "concentrated sulfuric acid" includes all of these agents.

The amounts of acid used, the temperatures of treating, the times of contacting and the procedure for separating the sludge produced from the sour oil are well known to ordinary workers in this art and will not be described.

In the process of the invention it has been observed that a sour oil having about 3–10 weight percent of oil soluble mahogany sulfonic acid therein is particularly suitable for the production of the desired high purity sulfonic acid. More commonly, the sour oil will contain the defined sulfonic acid in an amount of about 4–7 weight percent.

The defined sulfonic acid containing sour oil is first treated to remove acidic gases and pepper sludge (occluded tiny sludge particles). The sour oil normally contains a fair amount of dissolved sulfur dioxide and sometimes hydrogen sulfide. The dissolved gases and the pepper sludge are physically removed from the sour oil. Preferably, the sulfur dioxide, etc., are removed by blowing the sour oil with an inert gas such as nitrogen; if the blowing is done at a low enough temperature, air can be used as the blow gas. An inert gas is preferred in order to avoid chemical reactions in the oil.

The pepper sludge may be removed either by long-time gravity settling or by filtration, or preferably by centrifugal separation. The lower the content of acidic gases and occluded sludge, the easier it is to produce the desired essentially inorganic salt free product sulfonic acid.

The degassed and desludged sour oil is then intermingled with liquid water. The liquid water is added in an amount of about 1–6 weight percent based on the degassed-desludged oil. When processing a sour oil in the lubricating oil viscosity range, it is preferred to use about 2.5–5 weight percent of liquid water.

The liquid water and the oil are intimately intermingled for a time broadly within the range of about 3–180 minutes (3 hours); more commonly, the intermingling time is about 10–30 minutes. The liquid water and the oil are intermingled at a temperature of about 60°–125° F. and more commonly at a temperature of about 80°–105° F.

Liquid methanol is added to the mixture of oil and water. The liquid methanol is preferably of a quality which will not introduce contaminants either into the product oil or the product sulfonic acid. The liquid methanol for use in this process is essentially anhydrous; the commercial grade sold as anhydrous methanol is suitable for use in the process.

The liquid methanol is added in an amount of about 3–16 weight percent based on the degassed, desludged oil. When the process is applied to an oil in the lubricating oil viscosity range it is preferred to add about 5–12 weight percent of liquid methanol.

The mixture of oil, water and methanol is intimately intermingled for a time broadly of about 1–180 minutes (3 hours); more usually, the intermingling is carried on for a time of about 5–30 minutes.

The intermingling of the oil, water and methanol mixture is carried out at a temperature of about 60°–125° F. and more commonly at a temperature of about 80°–105° F.

It is to be understood that the particular temperature of intermingling will be determined by the viscosity of the oil and also by the amounts of water and methanol used in the process. The contacting is likewise dependent upon one or more of these variables plus the temperature of intermingling. The time and temperature of intermingling of the oil, water and methanol mixture is particularly important in order to avoid formation of methyl hydrogen sulfate, which compound is hereinafter considered to be an inorganic salt contaminant.

At the completion of the oil, water and methanol mixture intermingling, the mixture is separated into a raffinate phase and an extract phase. The separation may be made by conventional gravity settling or by centrifugal separation. The raffinate phase consists essentially of oil of substantially decreased, hereinabove defined sulfonic acid content. It is possible under the defined conditions of the process to produce a raffinite phase consisting essentially of oil substantially free of defined sulfonic acid. It is to be understood that some water and methanol will be dissolved in the raffinate phase.

The extract phase comprises oil soluble mahogany sulfonic acid, other acidic bodies, methanol and water. It has been observed that methanol reacts to some extent to form methyl hydrogen sulfate and this methyl hydrogen sulfate finds its way into the extract phase. Some sulfur acid, probably in the form of dissolved sludge, is also present in the extract phase. In some instances dissolved acidic gas may also be present in detectable amounts in the extract phase. The term "other acidic bodies" is intended to include all compounds present in the extract phase which will react as acids and excludes the oil soluble mahogany sulfonic acid present in the extract phase.

It has been discovered that by controlled treatment of the extract phase defined above with a calcium base it is possible to convert these other acidic bodies to a form which permits their physical separation from the oil soluble mahogany sulfonic acid. The calcium base utilized in this step of the process of the invention may be any calcium compound capable of reacting with materials such as sulfuric acid and methyl hydrogen sulfate to produce solid compounds insoluble in the defined sulfonic acid or solutions of the defined acid in hydrocarbon oil. For example, calcium oxide, calcium hydroxide and calcium carbonate have been used successfully in different embodiments of the process of the invention.

The calcium base is added to the defined extract phase in at least an amount corresponding to about one "theory." Herein a "theory" corresponds to the theoretical amount of calcium base needed to neutralize the inorganic acidity of the extract phase; in other words, the amount needed to react with the defined other acidic bodies. More than the minimum amount of about one "theory" is desirable, but with increasing usage of calcium base there is some side reaction to produce the calcium sulfonate and, therefore, it is desirable to limit usage of the calcium base to not more than about two theories. Oil soluble mahogany sulfonic acid which is essentially free of inorganic salt can be produced from oils in the lubricating oil viscosity range using calcium base in an amount of about 1.2–1.6 multiplied by the theoretical molar requirement to neutralize the acidity of said extract phase other than defined sulfonic acid present.

The calcium base may be added to the extract phase as is or as a dispersion in a hydrocarbon oil. The hydrocarbon oil may be one which is easily separated from the desired sulfonic acid product or one which is intended to be used as a diluent for the sulfonic acid product. The calcium base and the extract phase are intermingled for a time at a given temperature which will permit substantially complete reaction with the other acidic bodies. Commonly, the temperature of intermingling for this reaction is about 50°–100° F. and the time is about 5–60 minutes. It has been observed that satisfactory product is obtained when the calcium base reaction is carried out at ordinary ambient temperature such as 65°–85° F. when the time of reaction is about 15–45 minutes.

Solid bodies of reaction products as well as unreacted calcium base are present after the calcium base reaction has been completed. The solid bodies are separated by conventional procedures such as filtration or centrifugal separation to obtain a liquid phase. This solid body free liquid phase consists essentially of oil soluble mahogany sulfonic acid, some calcium sulfonate, water and methanol; the liquid phase may be described as being essentially free of inorganic salt, meaning calcium sulfate and the calcium salt of methyl hydrogen sulfate. Herein the term "essentially free of inorganic salt" is intended to mean substantially less than one percent of such salts present in the oil soluble mahogany sulfonic acid product and usually on the order of less than 0.7 weight percent of such salts.

When no diluent hydrocarbon has been used in the process, the oil soluble mahogany sulfonic acid product may be obtained by distillatively removing water and the methanol from the solid free liquid phase. Proper selection of hydrocarbon diluent will permit distillative removal of the diluent as well as the water and methanol to obtain the desired sulfonic acid product. In those cases where it is desirable that the sulfonic acid be dissolved in a hydrocarbon oil, then it may be possible to use the particular oil as a diluent during the calcium base treating step of the process of the invention.

TESTS

The process of the invention is illustrated hereinafter by the preparation of a large batch of sour oil; aliquot portions of this large batch were used in small scale equipment for comparison of the instant process with prior art techniques and also for a study of range of conditions of each operating variable which would permit the obtainment of the desired objects herein.

*Test 1*

A 50–50 volume percent blend of an oil in the lubricating oil viscosity range and a diluent oil was prepared for the initial sulfonation operation. The sulfonate producing oil was 26.9 API and had a viscosity SSU at 100° F. of 145.9 and at 210° F. of 41.7. The pour point of the sulfonate producing oil was −10° F. and the Cleveland Open Cup flash point was 395° F. Hereinafter "feed" means the diluted sulfonate producing oil. From the storage tank, the feed was pumped through a rotometer at 1 gallon/minute and into a heat exchanger where it was cooled to control the sulfonation temperature. The cold feed oil was then pumped into a Stratco contactor where it was mixed with 1.6 pounds/minute of 20 percent oleum. By adjusting the feed oil temperature, the sulfonation temperature was controlled to 150° F. The oleum drum was mounted on scales, and the oleum was metered into the mixer with a Milton-Roy pump.

A 2-H.P. motor turned the mixer in the Stratco contactor at 3,500 r.p.m. with an internal circulation rate of 150/g.p.m. The Stratco contactor had a 300 ml. mixing bowl, and the total feed rate was 1.1 g.p.m. (feed plus oleum) which gave a mixing residence time of 4.3 seconds.

From the Stratco unit, the sulfonation mass was fed to a Podbielniak centrifugal separator for continuous separation. The separator was run at 1,600 r.p.m. with a light liquid outlet pressure of 165 p.s.i.g. Samples of the sludge phase and acid-oil phase were collected at intervals and centrifuged in a small laboratory centrifuge to check separation efficiency. The sour oil was checked for sludge and the sludge was examined for oil. Weighed samples of each phase were collected over a time interval, and a material balance was made.

From the separator, the sour oil stream was fed directly into a Stratco flash type evaporator, operated at 5 mm. Hg absolute pressure; this operation removed essentially all the $SO_2$ from the sour oil. The degassed oil was pumped from the Stratco evaporator into storage drums.

The acid sludge produced in the oleum treatment had a specific gravity of 1.470 and contained only a trace of oil. The sour oil produced by the separator contained about 0.1 weight percent of sludge. The specific gravity of the 20 perecnt oleum was 1.905 so that 0.1 gallon/minute of oleum was mixed with the feed.

The degassed sour oil was centrifuged in a Westfalia unit at 10 gallons per hour to remove pepper sludge. The centrifuged oil was charged at a 100-gallon Pfaudler vessel. With agitation 3 weight percent of water, based on oil, was charged; and the mixture was heated to about 100° F. and agitated for 15 minutes; then 6 weight percent of methanol, based on oil, was charged; and the mixture was agitated at about 100° F. for 15 minutes. The mixture was then centrifuged in the Westfalia unit at room temperature at approximately 10 gallons per hour to separate the methanol-water-sulfonic acid containing liquid phase.

Another quantity of raffinate oil was obtained by a second extraction where an additional 31 pounds of methanol were mixed with the first extract phase. This mixture was centrifuged to remove a small quantity of second raffinate oil.

The second extract phase was charged to a 30-gallon Pfaudler vessel, and with agitation 1.86 pounds of $Ca(OH)_2$—1.5 theories—were charged to the kettle. The reaction was allowed to continue for 30 minutes at room temperature. The contents of the vessel were then filtered through the small Shriver press precoated with 2.0 pounds of Hyflo filter aid. The pressure drop across the filter was 60 p.s.i.g., and the filtering time was 27 minutes. This gave a filter rate of approximately 13 gallons per hour square foot.

The calcium hydroxide treated material produced from the filter press contained approximately 41 percent of oil soluble mahogany sulfonic acid; approximately 16 percent of water by the KF method and approximately 43 percent of methanol. The inorganic salt content which includes the reaction product of the methyl hydrogen sulfate was 0.25 percent; the extract phase before calcium hydroxide treating contained 2.13 percent of defined inorganic acid bodies as $Na_2SO_4$.

Tests 2–4

The equipment employed in these investigations of process variables and prior art procedures was conventional laboratory glass equipment. Flasks were three necked with ground glass joints; agitation was by air motors, and filters were coarse sintered glass and Büchner. The materials used were: Deionized water, methanol (Mallinckrodt "AR" grade), CaO (Baker's CP), $CaCO_3$ (Mallinckrodt USP precipitated) and $Ca(OH)_2$ (Baker's analyzed reagent). The sour oils employed in Tests 2–4 were obtained from the large batch made by the procedure of Test 1.

TABLE

| Test Number | 2 | 3 [1] | 4 |
|---|---|---|---|
| Extraction: | | | |
| Sour Oil, g | 3,000 | 3,000 | 1,000 |
| Water, Percent on Oil | 3.0 | | 3.0 |
| Methanol, Percent on Oil | 6.0 | 66% MeOH | 6.0 |
| Extract, g | 407.0 | 396.4 | 140.8 |
| Treating: | | | |
| Extract, g | 407.0 | 396.4 | 98.1 |
| $Ca(OH)_2$, g | 4.1 | 4.1 | 1.12 |
| $Ca(OH)_2$, x "Theory" | 1.0 | 1.0 | 1.5 |
| Sulfonic Acid, meq./g.[2] | 0.80 | 0.79 | 0.80 |
| Percent Salt, Hydrolyzed ($Na_2SO_4$) | 0.27 | 0.35 | 0.14 |
| Percent Salt, Hydrolyzed (100% Active Basis) | 0.77 | 1.02 | 0.40 |

[1] 66 percent methanol equals the water plus methanol usage of Test No. 2.
[2] Molar equivalents/gram at 430 combining weight.

(a) *Extraction.*—Typically, the sour, degassed, desludged oil was charged to a reaction flask. With agitation, the water was charged; and the reaction mass was heated to 100±5° F. and held at that temperature for 15 minutes. Methanol was then charged, and the flask was then stirred for 5 minutes at 100° F. Next, the reaction flask contents were poured into a separatory funnel for separation. Separation time varied from as little as two hours, to overnight settling which was preferred. The extract was then drawn from the raffinate (oil) phase to complete the extraction operation.

In some tests, aqueous methanol solution was charged directly to the "sour" oil and reactants stirred for 15 minutes at 100° F. The above procedure was then followed.

(b) *Calcium hydroxide treating.*—The extract was charged to a reaction flask. With agitation, the calculated amount of $Ca(OH)_2$ was added; and the reaction was continued for 30 minutes at ambient temperature. The reaction mass was then filtered through Hyflo filter aid to complete the processing. Temperature rise during the treating was usually 10–15° F.

Tests 2 and 3 were carried out under almost exactly identical conditions except that Test 2 was carried out according to the process of the invention and Test 3 was carried out using aqueous methanol. The results established that very closely the same amount of sulfonic acid was recovered in both tests. However, the salt content shows a considerable improvement in favor of the process of the invention. The salt content shown by procedure one picks up not only the salt provided by sulfuric acid, but also salt provided by the methyl hydrogen sulfate. Because this procedure involves a hydrolysis step, the salt content is identified in the table by the term "Hydrolyzed." The conventional procedure gives a lower number and, therefore, has not been shown here. It is stated as a fact that using the conventional salt procedure Test 2 has a lower salt content than does Test 3.

The lower of the two percent salt figures given for each test is based on the total filtrate product in each test. The higher number is the salt content related to the mahogany sulfonic acid content of the filtrate product.

Test 4 shows results obtainable by the process of the invention at more nearly the best combination of process conditions. It is observed that by using 1.5 theories of calcium hydroxide the percent salt content of the filtrate product is approximately one-half that obtained using 1.0 theory of calcium hydroxide. In the case of Test 4, the water and methanol extraction removed 97 weight percent of the sulfonic acid from the defined sour oil. The filtrate contained 30 weight percent of defined sulfonic acid, 4.7 weight percent of calcium sulfonate and 5.9 weight percent of sulfonate producing oil. Tests 2 and 4 conclusively establish the superiority of the process of the instant invention over the prior art procedure of using aqueous methanol as the solvent for the extraction of the sulfonic acid from the sour oil.

Thus having described the invention, what is claimed is:
1. A process for preparing oil soluble mahogany sulfonic acid which process comprises the sequential steps:
    (a) physically treating a sour oil, obtained by sulfuric acid treating of a hydrocarbon oil, to remove pepper sludge and gases therefrom, said sour oil containing oil soluble mahogany sulfonic acid;
    (b) intermingling said treated oil with liquid water in an amount of about 1–6 weight percent, based on said treated oil, at a temperature of about 60°–125° F. for a time of about 3–180 minutes;
    (c) intermingling essentially anhydrous liquid methanol with said treated oil-water mixture, in an amount of about 3–16 weight percent, based on said treated oil, at a temperature of about 60°–125° F. for a time of about 1–180 minutes;
    (d) separating a raffinate phase consisting essentially of oil of substantially decreased sulfonic acid content from an extract phase consisting essentially of methanol, water, oil soluble mahogany sulfonic acid and other acidic bodies including methyl hydrogen sulfate;
    (e) intermingling said extract phase with a calcium base, at a temperature of about 50°–100° F. for a time of about 5–60 minutes, in an amount corresponding to about 1–2 theories of calcium base, where a "theory" corresponds to the theoretical amount of calcium base needed to neutralize the other acidic bodies in said extract phase to form solid insoluble reaction products; and (f) separating the solid bodies present in said calcium treated extract phase to obtain a liquid phase consisting essentially of oil-soluble mahogany sulfonic acid, water and methanol, which liquid phase is essentially free of inorganic salt.

2. The process of claim 1 wherein said calcium base is calcium hydroxide.

3. The process of claim 1 wherein said calcium base is calcium oxide.

4. The process of claim 1 wherein said water usage is about 2.5–5 weight percent and said methanol usage is about 5–12 weight percent.

5. The process of claim 1 wherein said temperature of said water intermingling and said methanol intermingling operations is about 80°–105° F.

6. The process of claim 5 wherein said water intermingling time is about 10–30 minutes.

7. The process of claim 5 wherein said methanol intermingling time is about 5–30 minutes.

8. The process of claim 1 wherein said calcium base usage is 1.2–1.6 theories.

9. The process of claim 1 wherein said calcium base treating temperature is about 65°–85° F.

10. The process of claim 1 wherein said hydrocarbon oil is an oil in the lubricating oil viscosity range.

11. A process for producing essentially pure oil soluble mahogany sulfonic acid which process comprises the sequential steps (1) treating, with concentrated sulfuric acid, a hydrocarbon oil in the lubricating oil viscosity range, to obtain a sour oil having about 3–10 weight percent of oil soluble mahogany sulfonic acid therein; (2) physically degassing and removing occluded sludge particles from said sour oil; (3) adding about 2.5–5 weight percent of liquid water, based on said oil from step 2, to said oil from step 2 and intermingling the oil and water at a temperature of about 80°–105° F. for a time of about 20–30 minutes; (4) thereafter adding about 5–12 weight percent of essentially anhydrous liquid methanol, based on said oil from step 2 to the oil-water mixture of step 3 and intermingling said oil, water and methanol for about 5–30 minutes at a temperature of about 80°–105° F.; (5) separating a raffinate consisting essentially of oil substantially free of said sulfonic acid from an extract phase consisting essentially of oil soluble mahogany sulfonic acid, other acidic bodies including methyl hydrogen sulfate, water and methanol; (6) intermingling said extract phase with a calcium base, in an amount of about 1.2–1.6 multiplied by the theoretical molar requirement to neutralize the acidity of said extract phase other than sulfonic acid present, said neutralization-intermingling being carried out at a temperature of about 65°–85° F. for a time of about 15–45 minutes; (7) physically separating solid bodies present in said treated extract phase from step 6 to obtain a liquid phase essentially free of inorganic salt; and (8) distillatively removing water and methanol from said liquid phase obtained in step 7 to recover an oil soluble mahogany sulfonic acid product fraction essentially free of inorganic salt.

References Cited by the Examiner

UNITED STATES PATENTS

| | | | |
|---|---|---|---|
| 2,168,315 | 8/1939 | Blumer | 260—504 |
| 2,559,439 | 7/1951 | Jones et al. | 260—504 |
| 2,732,344 | 1/1956 | Bray | 260—504 X |
| 2,899,460 | 8/1959 | Sias et al. | 260—505 |
| 3,083,146 | 3/1963 | Sweeney et al. | 260—504 X |

LORRAINE A. WEINBERGER, *Primary Examiner.*

LEON ZITVER, *Examiner.*